United States Patent [19]

Decker et al.

[11] 4,029,846

[45] June 14, 1977

[54] FIBERBOARD SHIMS AND METHOD OF MAKING THEM

[75] Inventors: John W. Decker, Stockbridge; Mieczyslaw Talik, Dearborn Hts., both of Mich.

[73] Assignee: Eagle-Picher Industries, Inc., Cincinnati, Ohio

[22] Filed: May 20, 1975

[21] Appl. No.: 579,090

[52] U.S. Cl. .................................... 428/423; 21/7; 427/324; 427/334; 427/439; 428/537; 428/541
[51] Int. Cl.² .................. B32B 27/04; B32B 27/42
[58] Field of Search .......... 260/17.2; 427/439, 324, 427/333, 342, 399; 428/423, 424, 425, 537, 541; 21/7; 34/22, 23, 13.8

[56] References Cited

UNITED STATES PATENTS

| | | | |
|---|---|---|---|
| 2,430,479 | 11/1947 | Pratt et al. | 156/331 |
| 2,762,721 | 9/1956 | Wells | 428/541 |
| 3,248,254 | 4/1966 | Zeuk et al. | 428/425 |
| 3,539,386 | 11/1970 | Janssen | 428/423 |
| 3,666,593 | 5/1972 | Lee | 156/285 |

FOREIGN PATENTS OR APPLICATIONS

| | | |
|---|---|---|
| 1,460,423 | 10/1966 | France |
| 1,031,909 | 6/1966 | United Kingdom |

*Primary Examiner*—George F. Lesmes
*Assistant Examiner*—R. J. Roche
*Attorney, Agent, or Firm*—Wood, Herron & Evans

[57] ABSTRACT

Shims having improved torque retention, tensile strength, resistance to deformation, and low water absorption are formed from a resin-impregnated, cellulosic fiberboard, soaked in a solution of about 1 to about 20% by volume of methylene-bis-(4-phenyl isocyanate), and cured.

4 Claims, No Drawings

FIBERBOARD SHIMS AND METHOD OF MAKING THEM

BACKGROUND OF THE INVENTION

This invention relates to the manufacture of shims, and, more particularly, to the manufacture of shims from cellulosic fiberboard.

Shims are used in a variety of manufacturing operations to fill unwanted gaps or spaces in assembled articles, caused by imperfectly fitting components. For example, in the automotive industry, steel shims are commonly used to fill gaps during the assembly of automotive chassis, in the front suspension, cowl, and bumper areas. These shims are of various sizes and shapes and typically range from about 1 to 100 square inches in area and from about 1/16 inch to as much as ½ inch in thickness. Frequently more than one shim is required to fill a particular gap, the shims being tapped into place edgewise.

Steel shims have several disadvantages. They are relatively heavy and costly to produce, and they tend to rattle in service. Shims manufacture from a fiberboard material, formed of cellulose fibers bonded together by and impregnated with a suitable resin such as phenol impregnated board, overcome the aforementioned disadvantages of steel shims in that the fiber-board shims are less costly to produce, the have a lower bulk density than steel, and provide a sound deadening effect as compared to steel. However, fiberboard shims tend to deform and delaminate seriously as they are being tapped into place. Moreover, they tend to shrink during use, which then permits movement of the assembled components and which causes bolts running through the shims to lose their torque. Fiberboard shims are also relatively easily compressed and tend to absorb moisture during use.

Accordingly, it is among the principal objects of this invention to provide a method of making cellulosic fiberboard shims to overcome the aforementioned disdvantages of steel shims, and to provide shims which are relatively light weight but are dense, hard and strong and essentially chemical and moisture resistant.

BRIEF DESCRIPTION OF THE INVENTION

In accordance with the preferred embodiment of the invention, a solution of about 1 to 20%, by volume, of methylene-bis-(4-phenyl isocyanate) is provided. The preferred solvent is methyl ethyl ketone; however, the iscoyanate is also soluble in aromatic hydrocarbons, chlorinated aromatic hydrocarbons, nitrobenzene, acetone, ethers and esters. Preferably the solution is in the range of 12 to 20% by volume. Shims of desired configuration, formed from a resin bonded cellulosic fiberboard, are immersed in the solution until the board material is impregnated, and then cured, preferably at elevated temperature. The resulting shims have a surprisingly good torque retention and strength. They are relatively inexpensive compared to steel shims, and they are of low bulk density, high surface hardness and tensile strength, and are essentially chemical and moisture resistant.

DETAILED DESCRIPTION OF THE INVENTION

Isocyanates are generally known to the art and are widely used as ahesives and bonding agents. We have found use of the specific isocyanate, methylene-bis-(4-phenyl isocyanate), to be critical to the practice of the invention. This material is commerically available from E.I. DuPont de Nemours & Company under the trademark Hylene. Other isocyanates, if used to treat cellulosic fiberboard, do not produce comparable results. For example, fiberboard shims treated with a mixed ethyl, methyl, methylene bis- (4-phenol di-isocyanate) sold by Union Carbide Corporation under the trademark Nacconate exhibited very low resistance to compression at 5000 psi (50% poorer than Hylene) and lower recovery from compression. High resistance to compression is required in shims for good torque retention. Another isocyanate sold by DuPont under the trademark Hylene MP, which is a phenol blocked version of Hylene, required temperatures in excess of 300° F for curing which resulted in degradation of the fiberboard.

The invention will be more particularly described in the example which follows:

EXAMPLE

Fiberboard shims 0.120 inch thick were stamped from a commercial phenolic bonded fiberboard purchased from Jenkins Paper Co., Bridgewater, Mass., and from Colonial Fibers, Covington, Tennessee. The latter board is sold under the trademark Shoefiber S-601. Both boards had a bulk density of about 65 pounds per cubic foot.

The shims were immersed for 10 minutes in solutions having concentrations ranging from 2.5 to 20% by volume methylene-bis- (4-phenyl isocyanate). This iscoyanate is sold by DuPont under the trademark Hylene N-50, and is a 50% solution in mono-chlorobenzene. This was diluted further with methyle ethyl ketone, to the levels specificed. After soaking, the shims were removed from the solutions, allowed to drip 10 minutes, and were cured for 10 minutes in a furnace at a set temperature of 310° F. The isocyanate impregnated the surface of the material and did not form a film-like finish.

The tensile strength and moisture resistance of the shims were then tested. The moisture test was performed by immersing the shims in water at room temperature for 22 hours and measuring wt. percent water absored. The results are given in Table I for the board purchased from Jenkins Paper Company and in Table II for the board purchased from Colonial Fibers Company.

Table I

| Concentration (% by volume) | Tensile Strength (psi) | Water Absorption |
|---|---|---|
| untreated | 5239 | 29.4% |
| 20% | 5958 | 10.8% |
| 15% | 6135 | 11.9% |
| 12½% | 6392 | 13.3% |
| 10% | 6648 | 14.0% |
| 7½% | 6118 | 15.5% |
| 2½% | 5992 | 18.2% |

Table II

| Concentration (% by volume) | Tensile Strength (psi) | Water Absorption |
|---|---|---|
| untreated | 7237 | 25.5% |
| 20% | 7449 | 11.8% |
| 15% | 7834 | 12.7% |
| 12½% | 7715 | 16.0% |
| 10% | 7869 | 17.1% |
| 7½% | 8028 | 18.2% |
| 2½% | 7583 | 22.0% |

Both of the untreated samples were so deficient in terms of strength, resistance to water, and torque retention, that they were unsuitable for use in automobile assembly. By use of this invention, products were made which would satisfy the criteria for such use. As may be seen, maximum tensile strength was achieved at concentrations of 10% and 7½% with increases in tensile strength of 1409 psi and 632 psi, respectively. Further, the water absorption rate was greatly reduced as the concentration increased. The shims made in accordance with the above example exhibited good resistance to compression and good torque retention, were dense and had a hard surface. In comparison to untreated shims, they were resistant to deformation and delamination when hammered into place in an automobile chasis.

Without being limited to the following theory, we believe that the methylene-bis-(4-phenyl isocyanate) reacts in some way with the terminal ends of the cellulose fibers of the fiberboard with resultant production of an essentially chemical and moisture resistant, dense fiberboard. Moreover, the solution in crosslinking with the cellulose fibers also fills the pores and interstices of the board which increases the tensile strength of the board and provides a "case-hardening" effect that enables the fiber to withstand the stress of assembly and use.

Thus having described the invention, what is claimed is:

1. In a method of making automotive assembly shims for use in the assembly of imperfectly fitting automotive components, said method comprising;
   forming the shims from a phenolic resin impregnated cellulosic fiberboard,
   the improvement comprising:
   1. soaking said shims in a solution consisting of about 1 percent to about 20 percent by volume of methylene-bis(4-phenyl isocyanate),
   2. and thereafter curing the isocyanate-soaked shims, thereby causing the isocyanate to react with the cellulose fiber in said shims.

2. The method of claim 1 wherein said solution has a concentration of from about 12 to 20%, by volume.

3. The method of claim 1 wherein said shims are cured in a furnace at a time-temperature cycle equivalent to about 10° F for about 10 minutes.

4. In an article of manufacture comprising an automotive assembly shim for use in the assembly of imperfectly fitting automotive components, wherein
   said shims are formed of a phenolic resin impregnated cellulosic fiberboard, the improvement wherein
   said shims are further impregnated with a solution consisting of up to about 20 percent by volume of methylene-bis-(4-phenyl isocyanate), and cured.

* * * * *